(12) United States Patent
Byram

(10) Patent No.: US 6,750,748 B2
(45) Date of Patent: Jun. 15, 2004

(54) LIMITED ANGLE UNIDIRECTIONAL TORQUE MOTOR

(75) Inventor: Robert J. Byram, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/925,581

(22) Filed: Aug. 9, 2001

(65) Prior Publication Data

US 2003/0030332 A1 Feb. 13, 2003

(51) Int. Cl.$^7$ .............................. H01F 7/08; H01F 7/14
(52) U.S. Cl. .................... 335/272; 310/156.01; 310/254
(58) Field of Search ................................. 310/152, 156, 310/153, 156.01, 156.84, 254; 335/272

(56) References Cited

U.S. PATENT DOCUMENTS

| 3,375,512 | A | * | 3/1968 | Watkins et al. ............. 335/272 |
|---|---|---|---|---|
| 4,510,403 | A | | 4/1985 | Vanderlaan et al. ........... 310/36 |
| 4,612,526 | A | | 9/1986 | Vanderlaan et al. ......... 355/229 |
| 4,816,707 | A | | 3/1989 | Vanderlaan ................... 310/36 |
| 4,825,904 | A | * | 5/1989 | Grau et al. ................. 137/554 |
| 5,004,940 | A | | 4/1991 | Vanderlaan ................... 310/36 |
| 5,038,063 | A | | 8/1991 | Graber et al. ............... 310/115 |
| 5,453,972 | A | * | 9/1995 | Kanazawa et al. .......... 369/219 |
| 5,834,873 | A | * | 11/1998 | Muller ....................... 310/173 |
| 6,034,499 | A | | 3/2000 | Tranovich ................... 318/650 |
| 6,268,675 | B1 | * | 7/2001 | Amrhein ..................... 310/180 |

* cited by examiner

Primary Examiner—Ramon M. Barrera
(74) Attorney, Agent, or Firm—Jimmy L. Funke

(57) ABSTRACT

A torque motor comprising a rotor assembly and a stator assembly, the rotor assembly including a permanent rotor magnet being diametrically oriented, and the stator assembly including a pair of upper and lower stator poles spaced circumferentially around the rotor assembly wherein the stator poles are asymmetric in construction.

19 Claims, 4 Drawing Sheets

LIMITED ANGLE UNIDIRECTIONAL TORQUE MOTOR

BACKGROUND OF THE INVENTION

There is a wide range of electric motors used to perform various functions within the modern automobile. One particular application that requires a motor to apply torque over a limited angle of movement to open and close a valve element is the operation of a manifold vacuum restrictor valve ("MVRV") and/or a manifold runner control valve. In such utilities as these, the motor generally applies a torque over a limited angle of movement typically ranging from about 70° to about 90°, and typically is unidirectional in operation, working against a return spring mechanism.

SUMMARY OF THE INVENTION

Disclosed therein is a torque motor and method for increasing torque in a torque motor. In one embodiment, the torque motor comprises: a rotor assembly and a stator assembly, said rotor assembly including a permanent rotor magnet being diametrically oriented, and the stator assembly including a pair of upper and lower stator poles spaced circumferentially around said rotor assembly, wherein said stator poles are asymmetric in construction.

In another embodiment, the torque motor, comprises a rotor assembly comprising a permanent, diametrically oriented rotor magnet, and a stator assembly comprising a pair of stator poles spaced circumferentially around said rotor assembly, wherein one of said stator poles is sized larger than the other of said stator poles.

In one embodiment, the method of increasing the torque produced by a torque motor comprises arranging the magnetic material in said stator poles such that one of said stator poles has a greater amount of magnetic material than the other of said stator poles.

The above-described and other features will be appreciated and understood by those skilled in the art from the following detailed description, drawings, and appended claims.

DESCRIPTION OF THE PREFERRED EMBODIMENT

Figure 1:
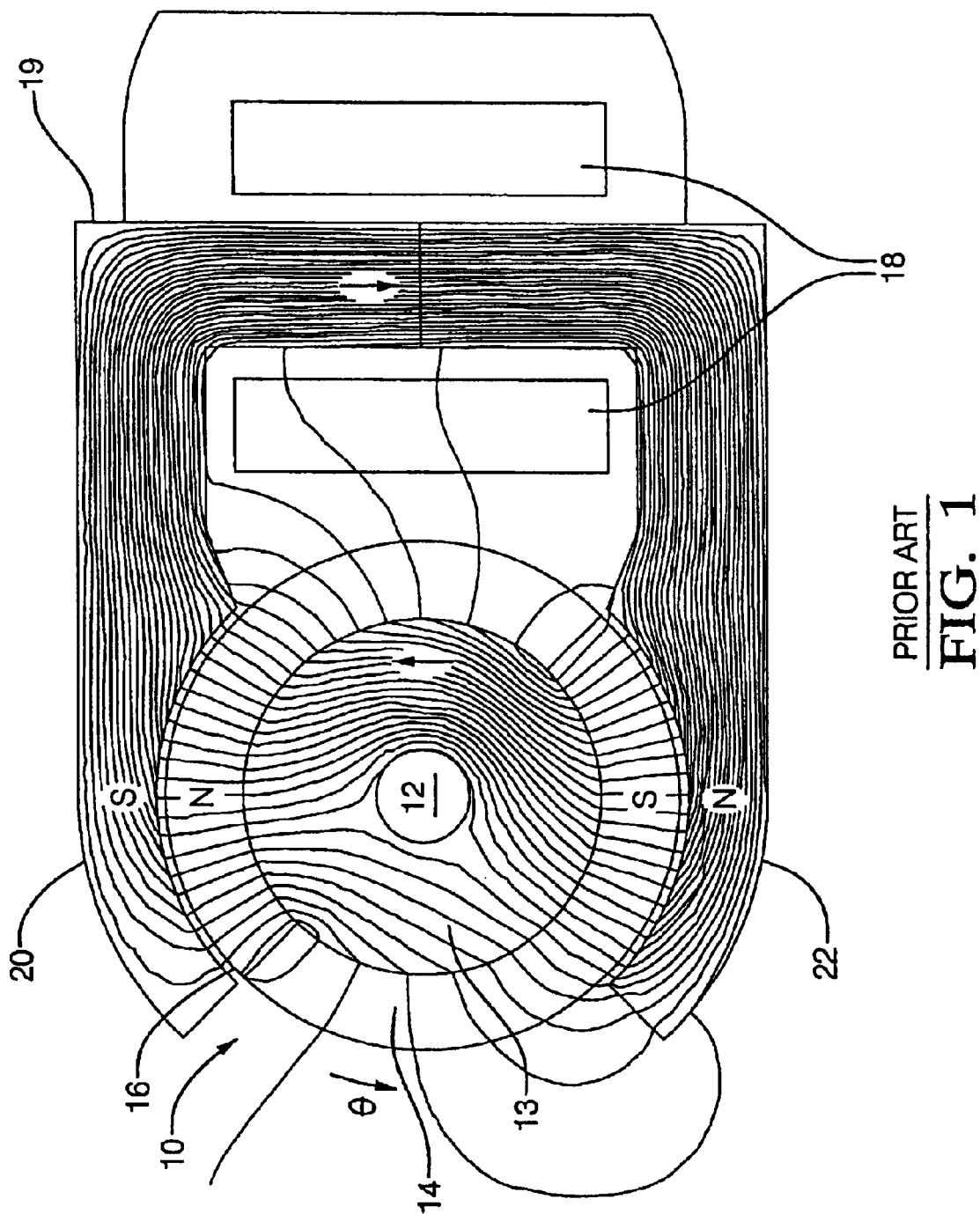
FIG. 1 depicts a cross-sectional view of a conventional design symmetrical bidirectional limited angle torque motor.

Referring to the drawings, FIG. 1 depicts a conventional prior art construction of a bidirectional limited angle torque motor. The motor comprises a motor assembly having one or more permanent magnets, and a stator assembly including a stator coil and a pair of circumferentially spaced stator pole structures. As illustrated, the torque motor has a rotor assembly 10 having a rotor shaft 12, a core 13, with one or more permanent magnets 14 intermediate the ends thereof. A stator assembly 16 surrounds the rotor assembly. The rotor magnet 14 is magnetized so that the North and South poles, N and S, are diametrically oriented as illustrated. A relatively small flux path clearance 16 separates the rotor and stator assemblies, thereby allowing notation of the rotor assembly relative to the stator assembly through its rotational angle range. The stator assembly includes one or more high density layer wound stator coils 18 around a stator coil core 19, and a pair of magnetic material stator pole structures, upper pole 20 and lower pole 22.

When the stator coil is excited by the application of a current, the stator magnetic upper and lower poles 20 and 22 will cause a cross or transverse magnetic flux through the stator assembly 16 and rotor assembly 10, which produces a turning torque in the motor. The density of the resulting magnetic field is represented by the flux density lines in FIG. 1. It should be noted that the loaded lower pole 22 indicates a high flux density while the unloaded upper pole 20 shows a low flux density. The motor is depicted with the rotor at Ø=90°.

Figure 2:
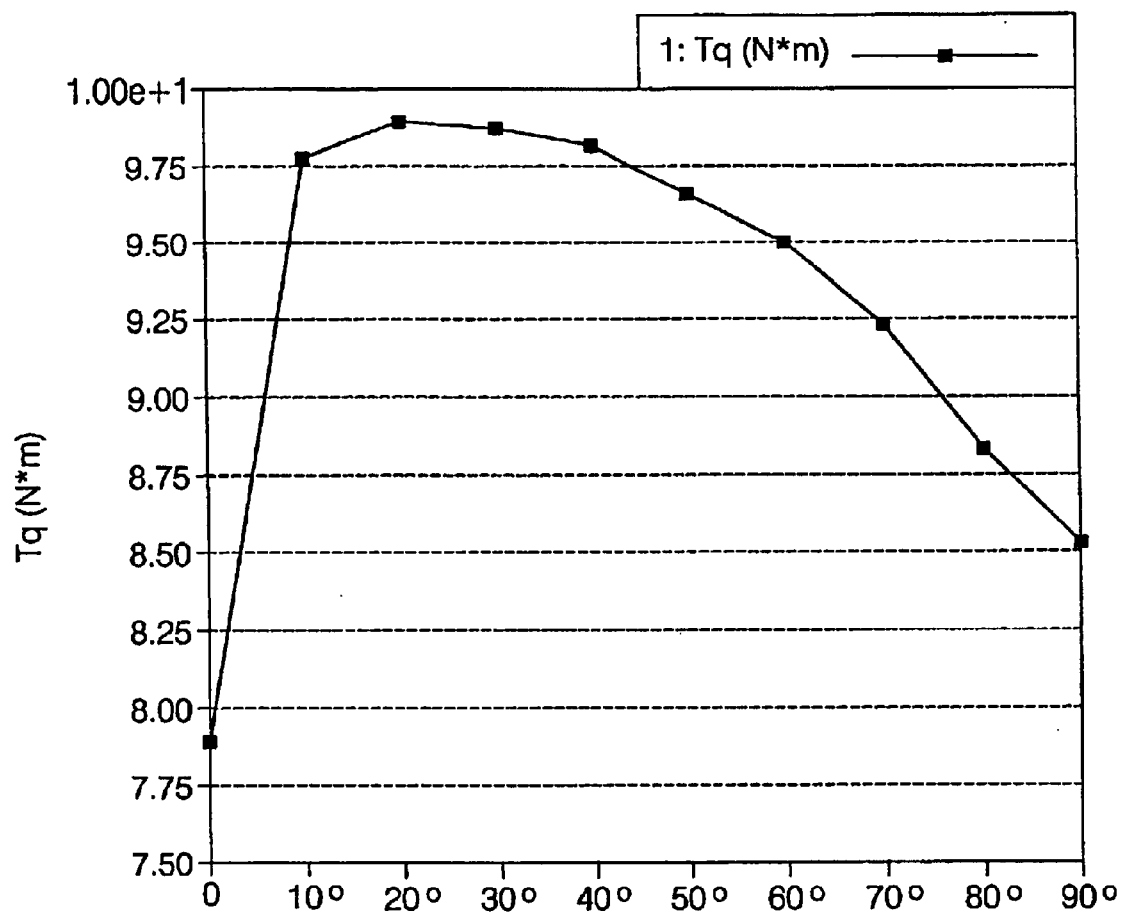
FIG. 2 is a graph showing the torque angle performance curve for the conventional symmetric torque motor of FIG. 1.

FIG. 2 depicts the resulting torque vs. angle curve resulting from the motor structure of FIG. 1.

Figure 3:
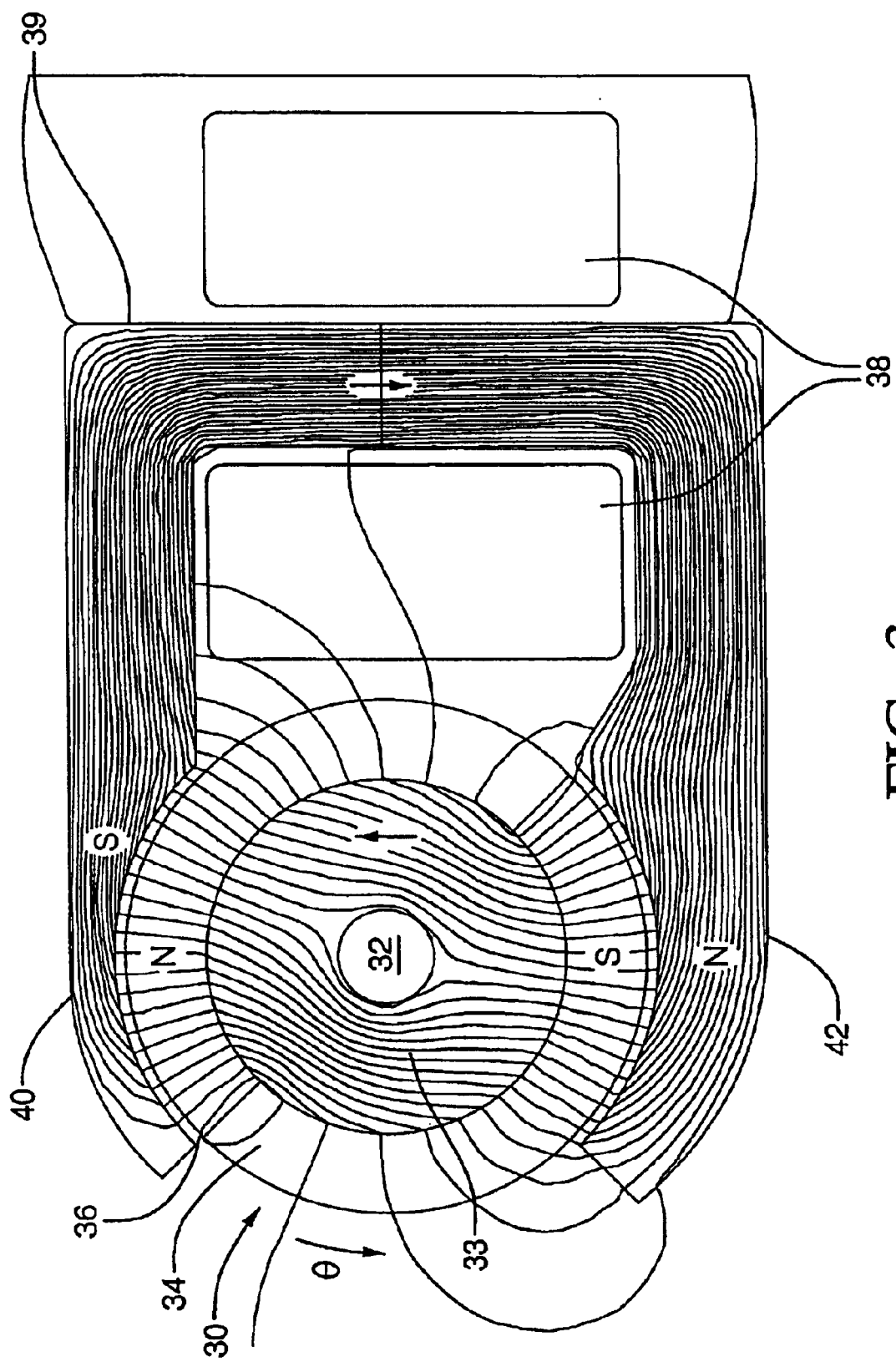
FIG. 3 shows a cross-sectional view of an asymmetrical unidirectional limited angle torque motor.

In FIG. 3, an improved design for a unidirectional limited angle torque motor is shown. Similar to the conventional motor of FIG. 1, the motor in FIG. 3 comprises a rotor assembly having one or more permanent magnets, and a stator assembly including a stator coil and a pair of circumferentially spaced stator pole structures. Referring to FIG. 3, the torque motor has a rotor assembly 30, having a rotor shaft 32, a care 33, with permanent magnet 34 intermediate the ends thereof. Stator assembly 36 surrounds the rotor assembly 30. Rotor magnet 34 is magnetized such that the North pole (N) and South pole (8) are diametrically oriented. A relatively small flux path clearance 36 separates the rotor assembly 30 from the stator assembly 36, allowing rotation of the rotor assembly 30 relative to the stator assembly 36 through its intended rotational angle range. The stator assembly 36 includes one or more high density layer wound stator coils 38 around a stator core 39, and a pair of magnetic material stator pole structures, preferably iron, upper pole 40 and lower pole 42. It should be noted that the torque motor of FIG. 3 features an asymmetric construction of the torque motor, wherein upper pole 40 and lower polo 42 are not symmetrical in widthwise construction, the width measured radially.

In the conventional motor depicted in FIG. 1, the upper and lower poles have equal widths. In contrast, in FIG. 3, the upper pole 40 has a smaller width than the lower pole 42. In order to maintain weight, overall motor dimensions, and magnetic material amount, it is desirable to increase the size of one pole while reducing the size of the other pole. For example, the upper pole 40 can be decreased in width versus a conventional pole, while the lower pole 42 can be increased in width versus a conventional pole. The specific size of each pole is based upon the overall desired torque, and therefore the amount of flux directed through each pole. For example, in contrast to a conventional system having two 5 millimeter (mm) poles, the upper pole 40 can be about 3 mm, while the lower pole 42 can be about 7 mm. Generally, the upper pole 40 can have a width of greater than or equal to about 20% of the width of the lower pole 42, with greater than or equal to about 30% of the width of the lower pole 42 preferred, and greater than or equal to about 35% of the width of the lower pole 42. Also preferred is a width less than or equal to about 80% of the width of the lower pole 42, with a width less than or equal to about 60% of the width of the lower pole 42 more preferred, and a width less than or equal to about 50% of the width of the lower pole 42 especially preferred.

The conventional torque motor of FIG. 1 suffers a degradation in torque at the extreme rotation of the rotor assembly 10, due to magnetic flux density saturation of the magnetic material in the loaded lower pole 22. Conversely, the un-loaded symmetric upper pole 20 becomes under-utilized because of the unipolar driving mechanization.

However, the improved motor construction, as shown in FIG. 3, alters the conventional structure by removing some of the magnetic material from the less-loaded upper pole 40 and adding it to the heavily loaded lower pole 42. This asymmetric construction of the stator poles is facilitated by the fact that the torque motor of the subject invention is designed as a unidirectional, limited angle motor. With such a design, the rotor rotates only through an angle typically ranging from about 70° to about 90°, and rotates only in a single direction. Accordingly, one of the stator poles, the pole which becomes loaded with magnetic flux density during rotor rotation, can be increased in its amount of magnetic material at the expense of the unloaded pole. In this manner, more torque is able to be produced by an improved motor having the same package size and same total magnetic material as the comparable conventional motor construction.

Figure 4:
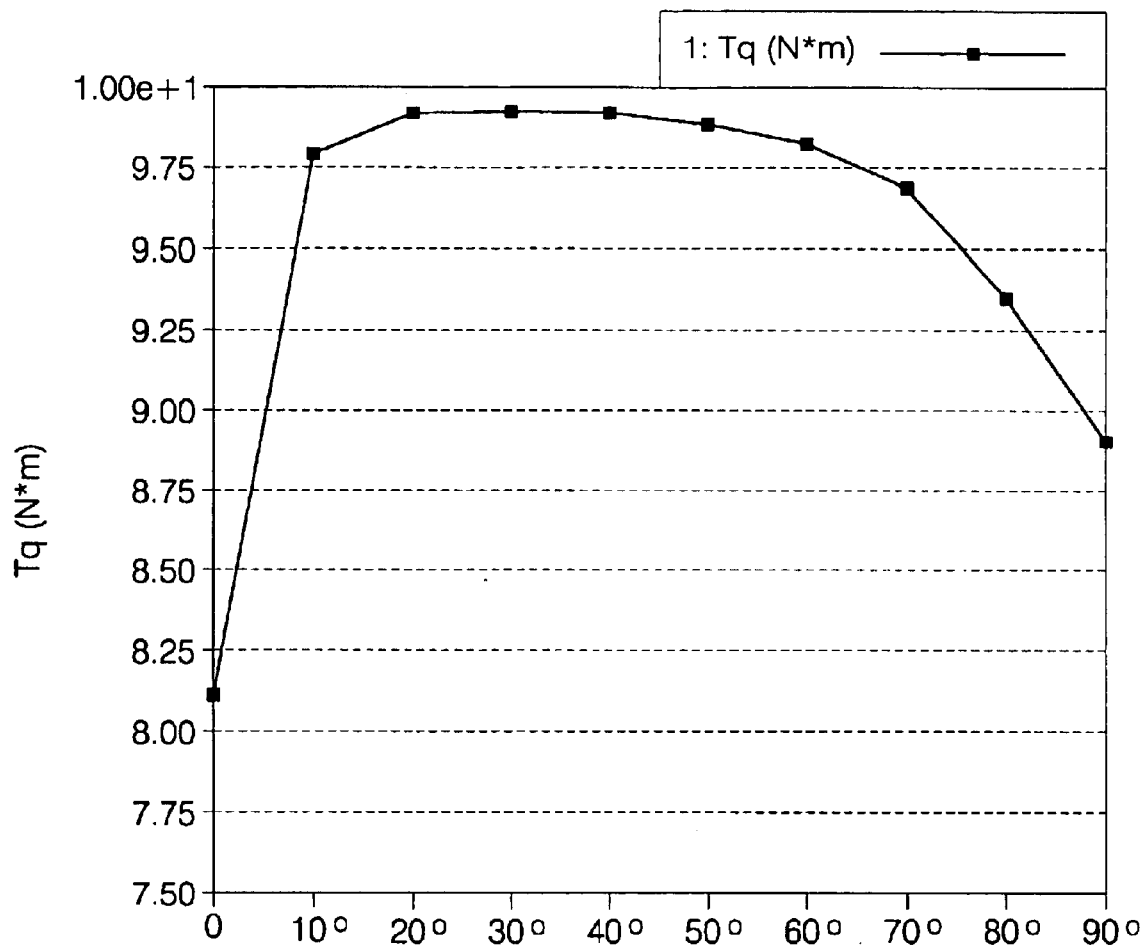
FIG. 4 is a graph illustrating the improved torque angle performance curve for the asymmetrical torque motor of FIG. 3.

FIG. 4 illustrates the resulting torque is angle curve resulting from the improved motor structure of FIG. 3. Essentially, the asymmetric suitor poles enables improved performance versus symmetric stator poles, without increasing overall motor dimensions, weight, or amount of magnetic material.

Figure 5:
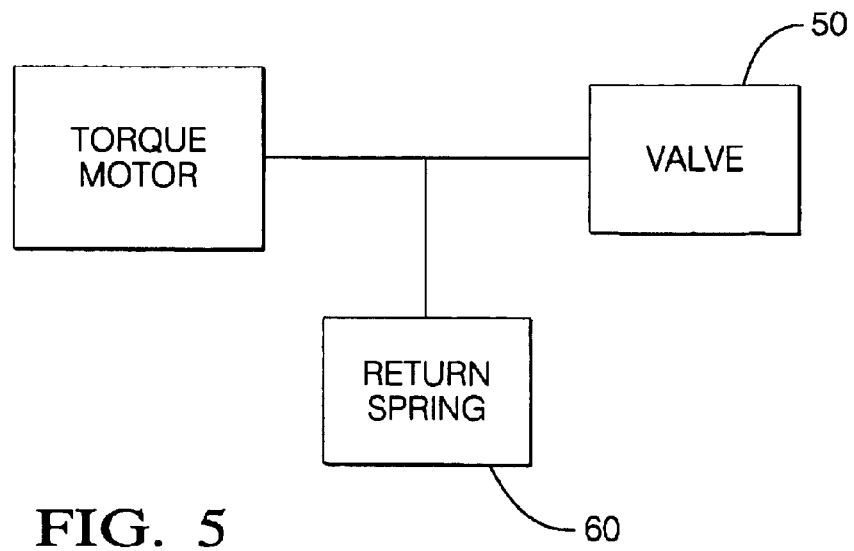
FIG. 5 depicts a simplified block diagram of a motor and valve configuration in accordance with an exemplary embodiment.

Referring now to FIG. 5 a simplified block diagram of a valve with a torque motor in accordance with an exemplary embodiment. In an exemplary embodiment a motor as depicted in FIG. 3 to apply torque over a limited angle of movement to open and close a valve element in the operation of a manifold vacuum restrictor valve ("MVRV") and/or a manifold runner control valve denoted 50. In such utilities as these, the motor generally applies a torque over a limited angle of movement typically ranging from about 70° to about 90°, and typically in unidirectional in operation, working against a returning spring mechanism 60.

While preferred embodiments have been shown and described, it will be understood by a person skilled in the art that various modifications and substitutions may be made thereto without departing from the spirit and scope of the invention. Accordingly, it is to be appreciated that the present invention has been described by way of illustration only, and such illustrations and embodiments as have been disclosed herein are not to be construed as limiting to the claims.

What is claimed is:

1. A torque motor, comprising:
a rotor assembly and a stator assembly, said rotor assembly including a permanent rotor magnet being diametrically oriented, and the stator assembly including a high density layer wound stator coil and a pair of upper and lower stator poles spaced circumferentially around said rotor assembly, wherein said stator poles are asymmetric in widthwise construction.

2. The torque motor of claim 1, wherein said motor is a unidirectional and limited angle torque motor.

3. The torque motor of claim 1 wherein upon application of a current to a stator coil, a turning torque in the motor is produced and one of said stator poles becomes a loaded pole and the other of said stator poles becomes an unloaded polo, and, wherein the loaded stator pole is larger in size than the unloaded stator pole.

4. The torque motor of claim 3, wherein the unloaded pole has an unloaded polo width of about 20% to about 80% of a loaded pole width.

5. The torque motor of claim 4, wherein the unloaded pole width is about 30% to about 60% of the loaded pole width.

6. The torque motor of claim 5, wherein the unloaded pole width is about 35% to about 50% of the loaded polo width.

7. The torque motor of claim 4, wherein the rotor assembly rotates over an angle of movement ranging from about 70° to about 90°.

8. A unidirectional torque motor, comprising a rotor assembly comprising a permanent, diametrically oriented rotor magnet, and a stator assembly comprising a high density layer wound stator coil and a pair of stator poles spaced circumferentially around said rotor assembly, wherein one of said stator poles is sized larger in width than the other of said stator poles.

9. The torque motor of claim 8, wherein the other stator pole has a smaller polo width of about 20% to about 80% of a larger pole width of the larger stator pole.

10. The torque motor of claim 9, wherein the smaller pole width is about 30% to about 60% of the larger pole width.

11. The torque motor of claim 10, wherein the smaller pole width is about 35% to about 50% of the larger pole width.

12. The torque motor of claim 8, wherein the rotor assembly rotates over an angle of movement ranging from about 70° to about 90°.

13. A method of increasing the torque produced by a torque motor having a rotor assembly and a stator assembly including a high density layer wound stator coil, comprising disposing a greater amount of magnetic material in one stator pole width than in another stator pole.

14. The method of claim 13, wherein the rotor assembly rotates over an angle of movement ranging from about 70° to about 90°.

15. An automotive system comprising a valve having a valve element operably connected to a motor such dint upon application of a current to a stator assembly of the motor, a torque is applied over a limited angle of movement to open and close the valve element, wherein the motor farther comprises a rotor assembly, said rotor assembly including a permanent rotor magnet being diametrically oriented, and wherein the stator assembly includes a pair of upper and lower suitor poles spaced circumferentially around the rotor assembly, wherein the stator poles are asymmetric in widthwise construction.

16. The automotive system of claim 15, wherein the motor is a unidirectional and limited angle torque motor.

17. The automotive system of claim 15, wherein the motor applies torque working against a return spring mechanism.

18. An automobile Comprising the automotive system of claim 15.

19. The automotive system of claim 15 wherein said suitor poles are asymmetric to address flux loading.

* * * * *